United States Patent
Stepp et al.

(10) Patent No.: US 10,934,396 B2
(45) Date of Patent: Mar. 2, 2021

(54) REACTIVE SILOXANES AND PROCESS FOR THE PRODUCTION THEREOF

(71) Applicant: WACKER CHEMIE AG, Munich (DE)

(72) Inventors: Michael Stepp, Ueberackern (DE); Leonie Deichner, Guteneck (DE)

(73) Assignee: WACKER CHEMIE AG, Munich (DE)

(*) Notice: Subject to any disclaimer, the term of this patent is extended or adjusted under 35 U.S.C. 154(b) by 24 days.

(21) Appl. No.: 16/342,335

(22) PCT Filed: Apr. 4, 2017

(86) PCT No.: PCT/EP2017/058013
§ 371 (c)(1),
(2) Date: Apr. 16, 2019

(87) PCT Pub. No.: WO2018/184668
PCT Pub. Date: Oct. 11, 2018

(65) Prior Publication Data
US 2019/0359774 A1    Nov. 28, 2019

(51) Int. Cl.
| | | |
|---|---|---|
| *C08G 77/06* | (2006.01) | |
| *C07F 7/18* | (2006.01) | |
| *C08G 77/12* | (2006.01) | |
| *C08G 77/18* | (2006.01) | |
| *C08G 77/20* | (2006.01) | |
| *C08G 77/24* | (2006.01) | |

(52) U.S. Cl.
CPC ............ *C08G 77/06* (2013.01); *C07F 7/1892* (2013.01); *C08G 77/12* (2013.01); *C08G 77/18* (2013.01); *C08G 77/20* (2013.01); *C08G 77/24* (2013.01)

(58) Field of Classification Search
CPC .................................................. C08G 77/06
See application file for complete search history.

(56) References Cited

U.S. PATENT DOCUMENTS

| 2,567,110 | A | | 9/1951 | Hyde | |
|---|---|---|---|---|---|
| 3,012,052 | A | * | 12/1961 | Simmler | C08L 83/04 556/455 |
| 5,637,668 | A | * | 6/1997 | Graiver | C08G 77/06 528/14 |
| 7,241,851 | B2 | * | 7/2007 | Cella | C07F 7/0874 528/13 |
| 2004/0068074 | A1 | * | 4/2004 | Yoshida | C08G 77/045 528/10 |
| 2004/0249103 | A1 | * | 12/2004 | Morimoto | C08G 77/045 528/34 |
| 2013/0145966 | A1 | | 6/2013 | Schildbach et al. | |
| 2014/0228589 | A1 | | 8/2014 | Stepp et al. | |
| 2014/0296556 | A1 | | 10/2014 | Stepp et al. | |
| 2017/0137445 | A1 | | 5/2017 | Stepp et al. | |
| 2017/0166595 | A1 | | 6/2017 | Stepp et al. | |

FOREIGN PATENT DOCUMENTS

| DE | 102014205258 A1 | 9/2015 |
|---|---|---|
| DE | 102014209583 A1 | 11/2015 |
| DE | 102014212698 A1 | 1/2016 |
| EP | 1557451 B1 | 4/2011 |
| WO | WO 95/35338 A2 * | 12/1995 |
| WO | 0127187 A1 | 4/2001 |
| WO | 2012022544 A1 | 2/2012 |
| WO | 2013041385 A1 | 3/2013 |
| WO | 2013075969 A1 | 5/2013 |
| WO | 2015176977 A1 | 11/2015 |

OTHER PUBLICATIONS

Guo Ping Cai and William P. Weber, "Synthesis of Polymethyl(trimethylsiloxy)siloane By Anionic Ring-Opening Polymerization of 1,3,5-Trimethyl-1,3,5-tris(trimethylsiloxy)cyclotrisiloxane" in Macromolecules, 2000, 33, pp. 6310-6314.

* cited by examiner

*Primary Examiner* — Marc S Zimmer
(74) *Attorney, Agent, or Firm* — Brooks Kushman P.C.

(57) ABSTRACT

Linear organopolysiloxanes of the structure M-(T-M)$_n$-M are prepared by reaction of lithium and/or sodium silanolates with chlorosilanes. The products contain at least two groups selected from silicon-bonded hydrogen and aliphatically unsaturated groups.

17 Claims, No Drawings

REACTIVE SILOXANES AND PROCESS FOR THE PRODUCTION THEREOF

CROSS REFERENCE TO RELATED APPLICATIONS

This application is the U.S. National Phase of PCT Appln. No. PCT/EP2017/058013 filed Apr. 4, 2017, the disclosure of which is incorporated in its entirety by reference herein.

BACKGROUND OF THE INVENTION

1. Field of the Invention

The invention relates to reactive siloxanes having a backbone composed of organotrifunctional siloxane units and also to a process for the production thereof from lithium or sodium salts of organosilanols (also referred to as "siliconates" hereinafter), with halosilanes.

2. Description of the Related Art

The siloxanes of the general formula (1) according to the invention $$R^1R^2R^3SiO-[R-Si(OSiR^4R^5R^6)O]_n-SiR^1R^2R^3 \quad (1)$$

(in the M-D-T-Q notation for siloxanes, abbreviated as M-(T-M)$_n$-M, where T is RSiO$_{3/2}$ and M is R$_3$SiO$_{1/2}$) are of industrial interest, inter alia, as highly reactive crosslinkers, e.g. for optical and electronic applications, as starting materials for functional fluids, e.g. surface-active compounds, and as potential units for siloxane resins. Their production and identification has not been described to date.

EP1557451 proposes linear polysiloxanes having a backbone composed of organotrifunctional siloxane units, mentioned as potential constituents of addition crosslinking silicone mixtures for release films (constituent B-1, general formula (2) for the case that q, r and s=0 and t>0). However, no indications of the production and use of these polymers are found therein. However, they have a high molar mass due to the limiting criterion of the viscosity of a 38% solution in toluene of at least 100 mPas at 25° C. In combination with the proviso that a pure TM polysiloxane may have a chain length of at most 17 (t≤15 in general formula (2)), the polymers according to the invention are excluded. The polysiloxanes B-1 described also do not comprise any SiH radicals.

WO 01/27187 (University of Southern California, 2000) claims a process for producing branched polysiloxanes similar to those of the general formula (1) by anionic or cationic ring-opening polymerization of monosilyl-substituted cyclotrisiloxanes that are complex to prepare. However, no fully silyl-substituted linear T polymers are accessible using this method, since only every third siloxane unit of the chain is trifunctional. In contrast, Guo Ping Cai and William P. Weber in *Macromolecules* 2000, 33, 6310-14 describe an approach to polysiloxanes having a backbone of T units, which are also accessible by anionic ring-opening polymerization of the corresponding T$_3$M$_3$ ring. A disadvantage of this method is the incompatibility of the method with SiH compounds, in addition to the complex preparation of the T ring and the process of the anionic polymerization that is only industrially viable with difficulty. In addition, therefore, only reaction products are accessible which comprise the anionic starter molecule in the form of a diphenylsiloxy unit (see FIG. 1, p. 6311). When using such polysiloxanes in customary methyl silicone mixtures, this can result in undesirable incompatibility and demixing.

It has been shown in DE 102014212698 OS that the reaction of potassium salts of organosilanols with monochloroorganosilanes results in predominantly cyclic siloxane structures (see examples 1-6).

U.S. Pat. No. 2,567,110 describes the reaction of a sodium methylsiliconate with trimethylchlorosilane (Ex. 1, column 6). Only cyclic structures can be derived from the theoretical average siliconate salt structure formulated in column 2, line 32 for a metal:Si ratio of 1:1. No structures for reaction products with chlorosilanes are formulated for metal:Si ratios<1. SiH units and Si units with unsaturated aliphatic radicals are not found.

SUMMARY OF THE INVENTION

The invention relates to a process for producing linear siloxanes of the general formula (1)

$$R^1R^2R^3SiO-[R-Si(OSiR^4R^5R^6)O]_n-SiR^1R^2R^3 \quad (1)$$

by reacting lithium or sodium salts of organosilanols consisting of units of the general formula (2)

$$R-Si(OH)_{3-m}(OM)_m \quad (2)$$

of condensation products thereof, or of lithium or sodium salts of silanols of the general formula (2) together with condensation products thereof, in which the molar ratio of lithium to silicon or sodium to silicon is 1.5, with halosilanes of the general formula (3)

$$R^7R^8R^9Si-Hal \quad (3)$$

wherein
m is a number 1.5
n is a number from 3 to 100
R is an organic radical bonded via carbon,
M is the lithium cation or the sodium cation,
Hal is a halogen radical and
R$^1$, R$^2$, R$^3$, R$^4$, R$^5$, R$^6$, R$^7$, R$^8$ and R$^9$ are each independently a hydrogen radical or an organic radical bonded via carbon or oxygen,
with the proviso that at least two radicals per molecule of the general formula (1) are selected from hydrogen and an aliphatic unsaturated organic radical.

DETAILED DESCRIPTION OF THE PREFERRED EMBODIMENTS

The invention also relates to linear siloxanes of the general formula (1)

$$R^1R^2R^3SiO-[R-Si(OSiR^4R^5R^6)O]_n-SiR^1R^2R^3 \quad (1)$$

wherein
n is a number from 3 to 100
R is an organic radical bonded via carbon,
R$^1$, R$^2$, R$^3$, R$^4$, R$^5$ and R$^6$ are each independently a hydrogen radical or an organic radical bonded via carbon or oxygen,
with the proviso that at least two radicals per molecule of the general formula (1) are selected from hydrogen and an aliphatic unsaturated organic radical and that if none of the radicals R$^1$, R$^2$, R$^3$ are hydrogen or an aliphatic unsaturated organic radical, at least one unit (OSiR$^4$R$^5$R$^6$) is also present in which the radicals R$^4$, R$^5$, R$^6$ are neither hydrogen nor an aliphatic unsaturated organic radical.

Surprisingly, it has been found that both lithium and sodium salts of organosilanols (so-called lithium or sodium siliconates) of the general formula (2) or condensation products thereof, in contrast to the corresponding potassium salts, afford linear siloxanes of the general formula (1) in the reaction with halosilanes of the general formula (3).

The process is based on easily accessible raw materials, is readily—also industrially—feasible and has very high selectivity. The disadvantages of the current prior art can thus be overcome. For instance, polysiloxanes having highly reactive pendant H—$SiR^4R^5O_{1/2}$—($M^H$) groups are accessible in a simple manner.

The lithium and/or sodium salts of silanols consisting of units of the general formula (2) and condensation products thereof used in the process are collectively referred to below as siliconates A.

The linear siloxanes of the general formula (1) can be used preferably as crosslinkers, e.g. for optical and electronic applications, as starting materials for functional fluids, e.g. surface-active compounds, and as potential units for siloxane resins.

The radical R in this case is preferably a monovalent Si—C bonded hydrocarbon radical having 1 to 30 carbon atoms that is unsubstituted or substituted by halogen atoms, $C_{1-6}$-alkyl, $C_{1-6}$-aryl or $C_{1-6}$-alkoxy or silyl groups, in which one or more —$CH_2$— units non-adjacent to one another can be replaced by —O— or —S— groups and there is no direct SiC bond to an aromatic carbon radical. The radical R can be linear, branched, cyclic, saturated or unsaturated.

R is particularly preferably a monovalent hydrocarbon radical having 1 to 18 carbon atoms that is unsubstituted or substituted by halogen atoms, alkoxy groups or silyl groups, in which there is no direct SiC bond to an aromatic carbon radical. Particular preference is given to unsubstituted alkyl radicals, cycloalkyl radicals, alkenyl radicals and alkylaryl radicals. The hydrocarbon radical R preferably has 1 to 8 carbon atoms. Particular preference is given to the methyl, ethyl, propyl, 3,3,3-trifluoropropyl, isobutyl (=2-methylprop-1-yl), vinyl, n-hexyl, 1-phenylethyl, 2-phenylethyl, the 4-vinyl-1-phenyl and the isooctyl radicals (e.g. 2,4,4-trimethylpent-1-yl radical), more preferably the methyl radical and the vinyl radical, especially the methyl radical. Mixtures of different radicals R can also be present in the siliconate A of the general formula (2).

Further examples of radicals R are: n-propyl, 2-propyl, chloromethyl, methoxymethyl, 3-chloropropyl, 2-(trimethylsilyl)ethyl, n-butyl, 2-butyl, t-butyl, n-pentyl, cyclopentyl, cyclohexyl, n-heptyl, n-octyl, 2-ethylhexyl, n-nonyl, n-decyl, n-undecyl, 10-undecen-1-yl, n-dodecyl, isotridecyl, n-tetradecyl, n-hexadecyl, allyl, 3-phenylpropyl radicals. Further examples of R are radicals —$(CH_2O)_o$—$R^{10}$, —$(CH_2CH_2O)_p$—$R^{11}$, and $CH_2CH(CH_3)O)_q$—$R^{12}$ where o, p and q are values from 1 to 10, especially 1, 2, 3. $R^{10}$, $R^{11}$ and $R^{12}$ are preferably an alkyl radical having 1 to 6 carbon atoms that is unsubstituted or substituted by halogen atoms. Examples of radicals $R^{10}$, $R^{11}$ and $R^{12}$ are the methyl, the ethyl, the propyl, the allyl and the butyl radicals, the methyl radical being particularly preferred.

The molar ratio of M:Si in the general formula (2), represented by the index m, is preferably at least 0.1, particularly preferably at least 0.4, especially at least 0.5 and at most 1.2, preferably at most 1.1, especially 1.0. However, mixtures of sodium and lithium cations, and also other metal cations in proportions of at most 10 mol %, may also be present.

The siliconates according to the invention are preferably prepared by the methods described in WO2013/041385, WO2012/022544, WO2013/075969 and particularly preferably in DE 102014205258 and 102014209583. Since the preparation process of the siliconate can have an influence on the composition of the target product of the general formula (1) according to the invention, the optimal siliconate can be determined in each case in preliminary experiments.

The radicals $R^1$, $R^2$, $R^3$, $R^4$, $R^5$ and $R^6$ in the linear siloxanes of the general formula (1) are formed from the radicals $R^7$, $R^9$ and $R^9$ in the halosilanes of the general formula (3).

The radicals $R^1$ to $R^9$ are preferably hydrogen, a $C_{1-10}$-alkoxy radical, a $C_{6-20}$-aryloxy radical or a monovalent hydrocarbon radical having 1 to 18 carbon atoms that is unsubstituted or substituted by halogen atoms, alkoxy groups or silyl groups. Particular preference is given to hydrogen, $C_{1-6}$-alkoxy, $C_{6-10}$-aryloxy and also to unsubstituted $C_{1-10}$-alkyl radicals, $C_{3-8}$-cycloalkyl radicals, $C_{7-21}$-alkylaryl radicals, $C_{7-21}$-arylalkyl radicals and phenyl radicals. Very particular preference is given to the hydrogen, methyl, ethyl, n-propyl, 3-chloropropyl, 3,3,3-trifluoropropyl, vinyl, n-hexyl and the phenyl radicals, especially preferably hydrogen, the methyl radical and the vinyl radical.

Further examples of radicals $R^1$ to $R^9$ are: 2-propyl, chloromethyl, methoxymethyl, 2-(trimethylsilyl)ethyl, 2-(trimethoxysilyl)ethyl, 2-(triethoxysilyl)ethyl, 2-(dimethoxymethylsilyl)ethyl, 2-(diethoxymethylsilyl)ethyl, n-butyl, 2-butyl, 2-methylpropyl, t-butyl, n-pentyl, cyclopentyl, n-hexyl, cyclohexyl, n-heptyl, n-octyl, 2-ethylhexyl, n-nonyl, n-decyl, n-undecyl, 10-undecenyl, n-dodecyl, isotridecyl, n-tetradecyl, n-hexadecyl, ethynyl, allyl, benzyl, p-chlorophenyl, o-(phenyl)phenyl, m-(phenyl)phenyl, p-(phenyl)phenyl, 1-naphthyl, 2-naphthyl, 2-phenylethyl, 1-phenylethyl, 3-phenylpropyl radicals.

In a preferred embodiment, at least two radicals, particularly preferably at least three radicals per molecule of the general formula (1) are aliphatic unsaturated organic radicals and no radical is hydrogen. Preference is given to alkenyl radicals, especially vinyl and allyl radicals.

In a further preferred embodiment, at least two radicals, particularly preferably at least three radicals per molecule of the general formula (1) are hydrogen and no radicals are aliphatic unsaturated organic radicals.

In a further preferred embodiment, at least one radical, particularly preferably at least two radicals per molecule of the general formula (1) are aliphatic unsaturated organic radicals and at least one radical, particularly preferably at least two radicals per molecule are hydrogen. Preferred aliphatic unsaturated organic radicals are alkenyl radicals, especially vinyl and allyl radicals.

The halosilanes of the general formula (3) are preferably chlorosilanes.

Examples of chlorosilanes of the general formula (3) are $H_3SiCl$, $Me_3SiCl$, $HSiMe_2Cl$, $ViSiMe_2Cl$, $PhSiMe_2Cl$, $PhClMeSiCl$, Allyl-$SiMe_2Cl$, $F_3$ $CH_2H_2$—$SiMe_2Cl$, $(EtO)_3SiCl$, $(MeO)_3SiCl$, $(EtO)_2SiMeCl$, $(MeO)_2SiMeCl$, $EtOSiMe_2Cl$, $MeOSiMe_2Cl$, Cl—$CH_2$—$SiMe_2Cl$, Cl—$(CH_2)_3$—$SiMe_2Cl$.

Particular preference is given to $Me_3SiCl$, $HSiMe_2Cl$, $ViSiMe_2Cl$, $PhSiMe_2Cl$, Cl—$CH_2$—$SiMe_2Cl$ and allyl-$SiMe_2Cl$, especially $Me_3SiCl$, $HSiMe_2Cl$ and $ViSiMe_2Cl$. Contamination by organodihalosilanes and trihalosilanes may be present, especially in industrial qualities, due to manufacturing tolerances. However, their proportion is preferably not more than 10 mol %.

Here, Me is methyl, Ph is phenyl, allyl is 2-propen-1-yl, Vi is vinyl and Cl is the chlorine radical.

The halosilanes are produced in the methylchlorosilane synthesis, preferably by the Müller-Rochow process, or can be produced as conversion products by chemical reactions according to known methods (e.g. hydrosilylation, nucleophilic substitution, radical substitution) and are mostly commercially available.

The compounds of the general formula (1) are obtained by the process according to the invention by reacting one or more siliconates A with one or more halosilanes of the general formula (3). This can be effected by adding the siliconate A to the halosilane or conversely by adding the halosilane to the siliconate A. In this case, at least one component is present advantageously in liquid form, e.g. suspended or dissolved. Most halosilanes are liquid at room temperature and standard pressure, the siliconates A being solid. It is therefore appropriate to dissolve or slurry the siliconates A in an inert solvent and to meter in the liquid halosilanes in pure form or dissolved in an inert solvent, in order to ensure as rapid a reaction as possible by virtue of good mixing. The solvents used are preferably aprotic polar and non-polar organic solvents, for example linear, branched or cyclic alkanes such as n-pentane, n-hexane, n-heptane, n-octane, isohexane, isooctane, cyclohexane, aromatic compounds such as benzene, toluene, o-xylene, m-xylene, p-xylene, ethers such as diethyl ether, di-n-propyl ether, di-n-butyl ether, methyl t-butyl ether, phenyl methyl ether, diphenyl ether, tetrahydrofuran, 2-methyltetrahydrofuran, dioxane, tetrahydropyran, 4-methyltetrahydropyran, ethylene glycol dimethyl ether, diethylene glycol dimethyl ether, triethylene glycol dimethyl ether, ethylene glycol dibutyl ether, polyethylene glycols or polypropylene glycols or polybutylene glycols or glycol copolymers of different molar masses/degrees of polymerization or siloxanes such as hexamethyldisiloxane, octamethyltrisiloxane, octamethylcyclotetrasiloxane, decamethylcyclopentasiloxane, methyltris(trimethylsiloxy)silane or mixtures of various solvents.

To scavenge the hydrogen halide formed in the reaction, an auxiliary base can be added. The auxiliary bases used may be basic salts or nitrogen-containing compounds such as amines, ureas, imines, guanidines, amides. Examples of basic salts are sodium hydride, sodium amide, sodium carbonate, sodium hydrogencarbonate, potassium carbonate, potassium hydrogencarbonate, calcium carbonate, calcium hydrogencarbonate, calcium oxide, magnesium carbonate, and magnesium oxide. Examples of nitrogen-containing compounds are ammonia, ethylamine, butylamine, trimethylamine, triethylamine, tributylamine, N,N-dimethyldecylamine, triisooctylamine, urea, tetramethylurea, guanidine, tetramethylguanidine, N-methylimidazole, N-ethylimidazole, piperidine, pyridine, picoline, and N-methylmorpholine. Nitrogen compounds are preferably used in which the nitrogen atoms do not bear any hydrogen.

The auxiliary base is preferably used in at least an equimolar amount with respect to the halosilane. Preferably at least 0.5, more preferably at least 1.0, and especially at least 2.0 base equivalents of auxiliary base are used per mole equivalent of halosilane. Larger amounts of auxiliary base may also be used—for example if at the same time this is intended to serve as solvent. However, this is usually of no advantage, but rather reduces the space-time yield and thus the economic viability of the process. The auxiliary base is preferably initially charged with the siliconate A and the halosilane of the general formula (3) is metered in. However, both reactants can be metered in to the auxiliary base in parallel, in which the auxiliary base is initially charged. Mixtures of different auxiliary bases can also be used.

In one embodiment of the process according to the invention, the siliconate A is reacted directly with the halosilane of the general formula (3) without auxiliary base and without solvent. If the siliconate A comprises free SiOH groups, which evolve gaseous hydrogen halide in the reaction of the halosilane of the general formula (3), this can be fed back without difficulty into the production process, for example in a combined hydrogen chloride system, and thus inexpensively recycled. If no auxiliary base is present, the siliconate A is preferably metered in to the halosilane, optionally dispersed in an inert solvent. Preferably, the hydrogen halide gas formed in this case is removed from the reaction mixture immediately after being formed by being entrained by an inert gas stream or by means of reduced pressure, in order to avoid undesired secondary reactions between the siliconate A and the hydrogen halide.

The halosilane of the general formula (3) is preferably used in at least an equimolar amount with respect to the siliconate A. Preferably, at least 0.8, more preferably at least 1.0, and especially at least 1.5 mol equivalents of halosilane of the general formula (3) are used per mole equivalent of siliconate silicon.

Preferably, at most 30 mol equivalents, more preferably at most 10 mol equivalents, and especially at most 6 mol equivalents of halosilane are used per mole equivalent of siliconate A.

It is also possible to use mixtures of different halosilanes of the general formula (3).

As a result, siloxanes of the general formula (1) having different $SiR^1R^2R^3$ and $SiR^4R^5R^6$ units are accessible. Particular preference is given to mixtures of trimethylchlorosilane and dimethylchlorosilane or dimethylvinylchlorosilane, since the SiH or Si-vinyl content in the end product can be very precisely adjusted via the mixing ratio. It is possible to react the siliconate A successively, firstly with a substoichiometric proportion of a halosilane of the general formula (3) and subsequently with a second halosilane of the general formula (3). On average, the siloxanes of the general formula (1) according to the invention comprise at least 2 addition crosslinkable units. This means statistically either at least 2 Si-bonded hydrogen radicals or at least 2 aliphatic unsaturated, preferably vinyl, radicals, or at least one Si-bonded hydrogen radical and at least one aliphatic, preferably vinyl, radical. Whereas the aliphatic unsaturated radicals can be introduced both via the siliconate A of the general formula (2) and via the halosilane of the general formula (3), it is only possible to introduce Si-bonded hydrogen radicals via the halosilane of the general formula (3).

The reaction of the siliconate A with the halosilane of the general formula (3) is preferably carried out at a temperature of at least −20° C., more preferably of at least 0° C., and especially at least 10° C. The maximum achievable temperature also arises from the boiling point of the lowest boiling component.

In order to avoid decomposition of the siliconate A, the reaction temperature preferably does not exceed 200° C., the reaction temperatures more preferably being at most 120° C., and especially at most 70° C.

In this case, the reaction mixture can be both cooled and heated, and individual components can also be brought to a certain temperature before they are brought into contact with one another, for example to be able to utilize the heat of reaction. The process can be carried out both in batchwise mode, for example in a stirrer, and continuously, e.g. in a loop reactor or tubular reactor or a fixed bed reactor or a paddle dryer. If the siliconate A is metered in as a solid or suspension, this can be effected via a solids lock (e.g. conveying screw or rotary feeder).

In the reaction of the siliconate A with the halosilane of the general formula (3), low-molecular weight linear and/or cyclic siloxanes may form as by-products to a very limited extent. In most cases, the removal of these by-products can be omitted. If required, these low-molecular weight siloxanes can be simply removed by distillation, for example by heating at reduced pressure in a short-path distillation.

The halide salts formed in the reaction from the siliconate and the auxiliary base optionally used can be filtered off, decanted off, centrifuged or dissolved in water and separated off as an aqueous solution. A solvent can also be added for the aqueous work-up, the solubility in water of which is as low as possible, in particular a maximum of 5% by weight at 25° C. An excess of halosilane of the general formula (3) potentially present is distilled off prior to the aqueous work-up. The aqueous work-up prior to the separation of the siloxane of the general formula (1) according to the invention is however unfavorable if the siloxane of the general formula (1) bears particularly moisture-sensitive radicals, for example alkoxy radicals, or has a high water solubility. In this case, the removal of the lithium or sodium salts by filtration, decanting or centrifugation and subsequent removal of the excess chlorosilane by distillation is preferable.

Owing to the sensitivity to hydrolysis of the halosilanes, the reaction of the siliconate A with halosilane of the general formula (3) is preferably carried out with exclusion of moisture, i.e. in a dry atmosphere or under reduced pressure, more preferably under an inert gas such as nitrogen, $CO_2$, argon, or lean air, preferably at 900 to 1100 hPa.

The composition of the polysiloxanes according to the invention can be very readily elucidated with the aid of $^{29}$Si-NMR spectroscopy. By means of the integration ratio of $TM_2$ end groups to TM units in the chain, the average chain length and thus the average molar mass can be readily determined. The average chain length can be controlled, for example, by the process of the siliconate production, for example by the sequence/type of the metered addition, the choice of solvent or the degree of dilution of the liquor. Further possibilities are the choice of solvent and degree of dilution in the reaction with chlorosilane, the choice of auxiliary base and the molar ratio of base:chlorosilane.

The index n in the general formula (1) is preferably at least 5, more preferably at least 10, especially at least 30, and is preferably at most 90, more preferably at most 70, and especially at most 60.

Preferably, at least 3 radicals, more preferably at least 5 radicals per molecule of the general formula (1) are selected from hydrogen and aliphatic unsaturated organic radicals.

If none of the radicals $R^1$, $R^2$, $R^3$ are hydrogen or an aliphatic unsaturated organic radical, preferably also at least 2, particularly preferably at least 3 units $(OSiR^4R^5R^6)$, are present in which the radicals $R^4$, $R^5$, $R^6$ are neither hydrogen nor an aliphatic unsaturated organic radical.

The following siloxanes of the general formula (1) are preferably produced by the process according to the invention:

$ViMe_2SiO—[SiVi(OSiMe_2Vi)O]_{47}—SiMe_2Vi$
$Me_3SiO—[SiVi(OSiMe_3)O]_{37}—SiMe_3$
$ViMe_2SiO—[SiMe(OSiMe_2Vi)O]_{37}—SiMe_2Vi$
$HMe_2SiO—[SiMe(OSiMe_2H)O]_{47}—SiMe_2H$
$HMe_2SiO—[SiMe(OSiMe_2H)O]_{33}—SiMe_2H$
$HMe_2SiO—[SiVi(OSiMe_2H)O]_{32}—SiMe_2H$
$HMe_2SiO—[Si—iOct(OSiMe_2H)O]_3—[SiMe(OSiMe_2H)O]_{34}—SiMe_2H$
$HMe_2SiO—[ViSi(OSiMe_2H)O]_5—[SiMe(OSiMe_2H)O]_{38}—SiMe_2H$
$ViMe_2SiO—[ViSi(OSiMe_2Vi)O]_8—[SiMe(OSiMe_2Vi)O]_{34}—SiMe_2Vi$

In the following mixed systems, produced from two different chlorosilanes and optionally a mixed siliconate, specified in each case is the average ratio of M and T units, since an assignment of M to T can no longer be made unambiguously:

$[MeSiO_{3/2}]_{45}[HMe_2SiO_{1/2}]_5[Me_3SiO_{1/2}]_{32}$
$[meSiO_{3/2}]_{47}[HMe_2SiO_{1/2}]_5[ViMe_2SiO_{1/2}]_3[Me_3SiO_{1/2}]_{41}$
$[ViSiO_{3/2}]_{31}[HMe_2SiO_{1/2}]_6[ViMe_2SiO_{1/2}]_8[Me_3SiO_{1/2}]_{19}$
$[meSiO_{3/2}]_{32}[ViSiO_{3/2}]_3[HMe_2SiO_{1/2}]_5[Me_3SiO_{1/2}]_{32}$
$[MeSiO_{3/2}]_{21}[ViSiO_{3/2}]_{20}[HMe_2SiO_{1/2}]_6[ViMe_2SiO_{1/2}]_3[Me_3SiO_{1/2}]_{34}$
$[MeSiO_{3/2}]_{38}[iOctSiO_{3/2}]_6[HMe_2SiO_{1/2}]_6[ViMe_2SiO_{1/2}]_4[Me_3SiO_{1/2}]_{36}$
$[MeSiO_{3/2}]_{32}[TFPSiO_{3/2}]_{16}[HMe_2SiO_{1/2}]_8[Me_3SiO_{1/2}]_{42}$
$[MeSiO_{3/2}]_{62}[iOctSiO_{3/2}]_{36}[ViMe_2SiO_{1/2}]_4[Me_3SiO_{1/2}]_{96}$
$[MeSiO_{3/2}]_{32}[PhViMeSiO_{1/2}]_3[Me_3SiO_{1/2}]_{31}$ where the index specifies a statistical average, Me is the methyl radical, Vi is the vinyl radical, iOct is the isooctyl radical, TFP is the 3,3,3-trifluoropropyl radical, Ph is the phenyl radical and these are distributed statistically in several different M or T units in the polysiloxane.

All aforementioned symbols of the formulae above have their meanings independently of one another. The silicon atom is tetravalent in all formulae.

In the following examples and comparative examples, unless stated otherwise, all amounts and percentages are based on weight and all reactions are carried out at a pressure of 1000 hPa (abs.).

The solids content is determined in each case with the HR73 Halogen Moisture Analyzer solids content balance from Mettler Toledo at 160° C.

The MALDI-TOF mass spectrum of the reaction products of the respective lithium or sodium siliconate and chlorosilane is recorded with the Shimadzu Axima Performance mass spectrometer in reflectron mode. For this purpose, the sample is dissolved in THF (10 mg/mL) and this is then mixed with the matrix trans-2-[3-(4-tert-butylphenyl)-2-methyl-2-propenylidene]malononitrile in THF (10 mg/mL) and the cationization reagent in THF (100 mmol/L). The cationization reagent used is LiTFA (=lithium trifluoroacetate) and CsI. The system is also internally calibrated using CsI, whereby a mass deviation of only 5 ppm is achieved. In the case of external calibration (in the case of LiTFA), mass deviations of up to 20 ppm are possible. From the mixture, 1 µL is applied to a stainless steel target, air-dried and measured. In this case, the homologous series of linear M-[T-M]$_x$-M siloxanes are unequivocally established.

The $^{29}$Si-NMR spectra of the siloxanes and the siloxanols are recorded with a Bruker Avance DPX 300 spectrometer at 59.63 MHz in each case using a 10 mm QNP sample probe. The solvent used is $C_6D_6$. The chemical shift δ is relative to tetramethylsilane. The following signal/structure assignments are assumed:

$[Me_3\underline{Si}O]_2$—$SiMeO_{1/2}$: 7.70 ppm ($\underline{M}$—T at the chain end, $M_2T$ group)
$[Me_3SiO]_2$—$\underline{Si}MeO_{1/2}$: −65.67 ppm (M-$\underline{T}$ at the chain end, $M_2T$ group)
$Me_3\underline{Si}O$—SiMe $[OSiMeO_{2/2}]_2$: 8.09 ppm ($\underline{M}$-T in the chain)
$Me_3SiO$—$\underline{Si}Me$ $[OSiMeO_{2/2}]_2$: −67.16 ppm (M-$\underline{T}$ in the chain)

[HMe$_2$SiO]$_2$—SiMeO$_{1/2}$: −6.20 ppm ($^H$M-T at the chain end, $^H$M$_2$T group)

[HMe$_2$SiO]$_2$—SiMeO$_{1/2}$: −64.13 ppm ($^H$M-T at the chain end, $^H$M$_2$T group)

HMe$_2$SiO—SiMe [OSiMeO$_{2/2}$]$_2$: −6.08 ppm ($^H$H-T in the chain)

HMe$_2$SiO—SiMe [OSiMeO$_{2/2}$]$_2$: −66.15 ppm ($^H$M-T in the chain)

[ViMe$_2$SiO]$_2$—SiMeO$_{1/2}$: −3.92 ppm ($^{Vi}$M-T at the chain end, $^{Vi}$M$_2$T group)

[ViMe$_2$SiO]$_2$—SiMeO$_{1/2}$: −65.9 ppm ($^{Vi}$M-T at the chain end, $^{Vi}$M$_2$T group)

ViMe$_2$SiO—SiMe [OSiMeO$_{2/2}$]$_2$: −3.5 ppm ($^{Vi}$M-T in the chain—overlayed by 1,1,3,3-tetamethyl-1,3-divinyldisiloxane) ViMe$_2$SiO—SiMe [OSiMeO$_{2/2}$]$_2$: −67.4 ppm ($^{Vi}$M-T in the chain)

EXAMPLE 1 a) Production of Sodium Methyl Siliconate Powder (Na:Si=0.5:1)

In analogy to preparation example 1 in WO2012/022544 (PCT/EP2011/061766), a siliconate powder is produced by reacting 70 g of methyltrimethoxysilane (>98%, WACKER CHEMIE AG) in 123 g of Isopar® E (isoparaffinic hydrocarbon mixture having a boiling range of 113-143° C., available commercially from ExxonMobil) and a mixture of 22.5 g of 45% aqueous sodium hydroxide solution and 19.5 g of completely demineralized water and subsequent azeotropic drying. After distilling off the volatile constituents at 120° C., 3 hPa, there remain 41.3 g of a fine-grained white powder having a solids content of 99.7%. The sodium content determined by ICP-OES is 12.4% by weight.

b) Reaction of the Siliconate of Example 1a) With Trimethylchlorosilane/Dimethylchlorosilane Mixture (9:1)

1 g of the siliconate powder obtained in Ex. 1 a) is initially charged in a mixture of 11.2 g of Isopar® E and 4 g of pyridine (Merck KGaA, >99.5%) at 23° C. To this suspension is metered in dropwise a mixture of 3.6 g of trimethylchlorosilane (technical grade quality, >99%, WACKER CHEMIE AG) and 0.35 g of dimethylchlorosilane (technical grade quality, >98%, WACKER CHEMIE AG). The white suspension is allowed to stir at room temperature (ca. 23° C.) for 20 hours before 7 g of demineralized water are added. After 30 minutes, the mixture is filtered and a $^{29}$Si-NMR spectrum of the upper organic phase of the filtrate is recorded. In addition to the signals for trimethylsilanol, hexamethyldisiloxane and 1,1,3,3-tetramethyldisiloxane, signals are found for the M$_2$T end groups and MT chain fragments in a molar ratio of 1:16. The molar ratio of HM:M units corresponds to the chlorosilane used.

EXAMPLE 2 a) Production of Sodium Methyl Siliconate Powder (Na:Si=0.65:1)

In analogy to preparation example 1 in WO2012/022544 (PCT/EP2011/061766), a siliconate powder is produced by reacting 70 g of methyltrimethoxysilane in 123 g of Isopar® E and a mixture of 29.3 g of 45% aqueous sodium hydroxide solution and 15.8 g of completely demineralized water and subsequent azeotropic drying. After distilling off the volatile constituents at 120° C., 3hPa, there remain 41.1 g of a fine-grained white powder having a solids content of 99.5%. The sodium content determined by ICP-OES is 16.9% by weight.

b) Reaction of the Siliconate of Example 2 a) With Trimethylchlorosilane/Dimethylchlorosilane Mixture (9:1)

1 g of the siliconate powder obtained in Ex. 2 a) is initially charged in a mixture of 11.2 g of Isopar® E and 4 g of pyridine at 23° C. To this suspension is metered in dropwise a mixture of 3.6 g of trimethylchlorosilane (technical grade quality, >99%, WACKER CHEMIE AG) and 0.35 g of dimethylchlorosilane (technical grade quality, >98%, WACKER CHEMIE AG). The white suspension is allowed to stir at room temperature (ca. 23° C.) for 20 hours before 7 g of demineralized water are added. After 30 minutes, the mixture is filtered and a $^{29}$Si-NMR spectrum of the upper organic phase of the filtrate is recorded. In addition to the signals for trimethylsilanol, 1,1,3,3-tetramethyldisiloxane and hexamethyldisiloxane, signals are found for the M$_2$T end groups and MT chain fragments in a molar ratio of 1:23.5. The molar ratio of HM:M units corresponds to the chlorosilane used.

EXAMPLE 3 a) Production of Sodium Methyl Siliconate Powder (Na:Si=1:1)

600 g of Isopar® E are initially charged in a 2 L laboratory reactor at 50° C. Then, 500 g of methyltrimethoxysilane are metered in in parallel with a mixture of 321.7 g of 45% aqueous sodium hydroxide solution and 51.1 g of completely demineralized water over a period of one hour. At the end of the metered addition, a cloudy biphasic mixture is present. The mixture is heated to boiling and water and methanol formed are separated off continuously as a lower phase via a water separator. After distilling off the volatile constituents at 120° C., 3 hPa, there remain 363.2 g of a fine-grained white powder having a solids content of 99.8%. The sodium content determined by ICP-OES is 21.0% by weight.

b) Reaction of the Siliconate of Example 3 a) With Vinyldimethylchlorosilane 20 g of the siliconate powder obtained in Ex. 3 a) is initially charged in a mixture of 68.2 g of Isopar® E and 35.5 g of pyridine at 24° C. To this suspension, 64 g of vinyldimethylchlorosilane are metered in over 35 minutes. The white suspension is allowed to stir at room temperature (ca. 24° C.) for 3 hours before 120.5 g of demineralized water are added over 20 minutes. After a further 2 hours, the insoluble white precipitate (17.5 g) is filtered off. The aqueous phase has a pH of 5 and comprises 0.03% by weight silicon. The clear colorless organic phase is concentrated at 70° C./1 hPa on the rotary evaporator. Thereafter, 19.7 g of a clear colorless viscous liquid remained.

In the $^{29}$Si-NMR spectrum of the residue are found exclusively signals for the $^{Vi}$M$_2$T end groups and $^{Vi}$MT chain fragments in a molar ratio of 1:18.5. The composition and molar mass distribution are confirmed by the MALDI-TOF spectrum.

EXAMPLE 4 a) Production of Sodium Methyl Siliconate Powder (Na:Si=1:1)

A solution of 650 g of methyltrimethoxysilane in 780 g of Isopar® E is initially charged in a 2 L laboratory reactor at 50° C. Then a solution of 418.3 g of 45% aqueous sodium hydroxide solution and 66.4 g of completely demineralized water are metered in over a period of one hour. The tempertaure increases here to 63° C. The mixture is allowed to stir for half an hour before heating to boiling and methanol and water are removed by means of a water separator. A suspension is formed here from which volatiles part at 100° C./10 hPa. The remaining moist powder is dried for one hour at 95° C. and 10 hPa. There remains 481.2 g of a fine-grained white powder having a solids content of 99.7%.

b) Reaction of the Siliconate of Example 4 a) With Dimethylchlorosilane 212 g of the siliconate powder obtained in Ex. 4 a) are initially charged in a mixture of 756.8 g of Isopar® E and 303.3 g of pyridine at 23° C. To this suspension, 431.9 g of dimethylchlorosilane(technical grade quality, >98%, WACKER CHEMIE AG) are metered in over 45 minutes. The temperature of the reaction mixture is maintained below 33° C. here by cooling with an ice bath. The white suspension is allowed to stir at room temperature (ca. 23° C.) for 3 hours before 1492 g of demineralized water are added over 17 minutes. After 10 minutes, undissolved solids are filtered off and the two liquid phases are separated. The aqueous phase has a pH of 5. The clear colorless organic phase is concentrated at 100° C./1 hPa on the rotary evaporator. Thereafter, 222.8 g of a clear colorless viscous liquid remains.

In the $^{29}$Si-NMR spectrum of the residue are found exclusively signals for the $^HM_2T$ end groups and HMT chain fragments in a molar ratio of 1:23.4. The composition and molar mass distribution are confirmed by the MALDI-TOF spectrum.

EXAMPLE 5

Reaction of the Siliconate of Example 2 a) With Vinyldimethylchlorosilane 1 g of the siliconate powder obtained in example 2 a) is initially charged in a mixture of 11.2 g of Isopar® E and 4 g of pyridine at 23° C. To this suspension are metered in dropwise 4 g of vinyldimethylchlorosilane (technical grade quality, >98%, WACKER CHEMIE AG). The white suspension is allowed to stir at room temperature (ca. 23° C.) for 20 hours before 7 g of demineralized water are added. After 30 minutens, the mixture is filtered and a $^{29}$Si-NMR spectrum of the upper organic phase of the filtrate is recorded. In addition to the signal for vinyldimethylsilanol, signals are found for the $M_2T$ end groups and MT chain fragments in a molar ratio of 1:20.

EXAMPLE 6 a) Production of Sodium Methyl Siliconate Powder (Na: Si=0.85:1)

In analogy to preparation example 1 in WO2012/022544 (PCT/EP2011/061766), a siliconate powder is produced by reacting 70 g of methyltrimethoxysilane in 123 g of Isopar® E and a mixture of 38.3 g of 45% aqueous sodium hydroxide solution and 10.9 g of completely demineralized water and subsequent azeotropic drying. After distilling off the volatile constituents at 120° C., 3 hPa, there remain 43.1 g of a fine-grained white powder having a solids content of 99.9%. The sodium content determined by ICP-OES is 20.4% by weight.

b) Reaction of the Siliconate of Example 6 a) With Vinyldimethylchlorosilane 1 g of the siliconate powder obtained in example 6 a) is initially charged in a mixture of 11.2 g of Isopar® E and 4 g of pyridine at 23° C. To this suspension are metered in dropwise 4 g of vinyldimethylchlorosilane (technical grade quality, >98%, WACKER CHEMIE AG). The white suspension is allowed to stir at room temperature (ca. 23° C.) for 20 hours before 7 g of demineralized water are added. After 30 minutens, the mixture is filtered and a $^{29}$Si-NMR spectrum of the upper organic phase of the filtrate is recorded. In addition to the signal for vinyldimethylsilanol, signals are found for the M2T end groups and MT chain fragments in a molar ratio of 1:29.2

EXAMPLE 7 a) Production of Sodium Methyl Siliconate Powder (Na: Si=1.2:1)

In analogy to preparation example 1 in WO2012/022544 (PCT/EP2011/061766), a siliconate powder is produced by reacting 70 g of methyltrimethoxysilane in 123 g of Isopar® E and a mixture of 54.1 g of 45% aqueous sodium hydroxide solution and 2.2 g of completely demineralized water and subsequent azeotropic drying. After distilling off the volatile constituents at 120° C., 3hPa, there remain 54.4 g of a fine-grained white powder having a solids content of 99.6%. The sodium content determined by ICP-OES is 24.9% by weight.

b) Reaction of the Siliconate of Example 7 a) with Vinyldimethylchlorosilane 1 g of the siliconate powder obtained in example 7 a) is initially charged in a mixture of 11.2 g of Isopar® E and 4 g of pyridine at 23° C. To this suspension are metered in dropwise 4 g of vinyldimethylchlorosilane (technical grade quality, >98%, WACKER CHEMIE AG). The white suspension is allowed to stir at room temperature (ca. 23° C.) for 20 hours before 7 g of demineralized water are added. After 30 minutens, the mixture is filtered and a $^{29}$Si-NMR spectrum of the upper organic phase of the filtrate is recorded. In addition to the signal for vinyldimethylsilanol, signals are found for the $M_2T$ end groups and MT chain fragments in a molar ratio of 1:12.5

EXAMPLE 8 a) Production of Lithium Methyl Siliconate Powder (Li: Si=1:1)

In analogy to preparation example 1 in WO2012/022544 (PCT/EP2011/061766), a siliconate powder is produced by reacting 65 g of methyltrimethoxysilane in 104 g of Isopar® E and a mixture of 19.7 g of lithium hydroxide monohydrate (Aldrich) and 200 g of completely demineralized water and subsequent azeotropic drying. After distilling off the volatile constituents at 100° C., 10 hPa, there remain 40.6 g of a fine-grained white powder having a solids content of 99.2%. The lithium content determined by ICP-OES is 8.68% by weight.

b) Reaction of the Siliconate of Example 8 a) With Vinyldimethylchlorosilane 1 g of the siliconate powder obtained in example 8 a) is initially charged in a mixture of 11.2 g of Isopar® E and 4 g of pyridine at 23° C. To this suspension are metered in dropwise 4 g of vinyldimethylchlorosilane (technical grade quality, >98%, WACKER CHEMIE AG). The white suspension is allowed to stir at room temperature (ca. 23° C.) for 20 hours before 7 g of demineralized water are added. After 30 minutens, the mixture is filtered and a $^{29}$Si-NMR spectrum of the upper organic phase of the filtrate is recorded. In addition to the signal for vinyldimethylsilanol, signals are found for the $M_2T$ end groups and MT chain fragments in a molar ratio of 1:4

The invention claimed is:

1. A process for producing linear siloxanes of the formula (1)

$$R^1R^2R^3SiO\text{—}[R\text{—}Si(OSiR^4R^5R^6)O]_n\text{—}SiR^1R^2R^3 \quad (1),$$

comprising reacting lithium or sodium salts of organosilanols containing units of the formula (2)

$$R\text{—}Si(OH)_{3-m}(OM)_m \quad (2),$$

or hydrolysis/condensation products thereof, or a mixture of these, in which the molar ratio of lithium to silicon or sodium to silicon is ≤1.5,
with halosilanes of the formula (3)

$$R^7R^8R^9Si\text{—}Hal \quad (3)$$

wherein
m is a number ≤1.5
n is a number from 3 to 100
R is an organic radical bonded to silicon via carbon,
M is a lithium cation or a sodium cation,
Hal is a halogen radical and
$R^1$, $R^2$, $R^3$, $R^4$, $R^5$, $R^6$, $R^7$, $R^8$ and $R^9$ are each independently a hydrogen radical or an organic radical bonded to silicon via carbon or oxygen, wherein radicals $R^1$, $R^2$, $R^3$, $R^4$, $R^5$, and $R^6$ in the linear siloxanes of formula (1) are derived from radicals $R^7$, $R^8$, $R^9$ of the halosilanes of the formula (3),
with the proviso that at least two radicals per molecule of the formula (1) are hydrogen and/or aliphatic unsaturated organic radicals.

2. The process of claim 1, or in which R is a monovalent hydrocarbon radical having 1 to 18 carbon atoms that is unsubstituted or substituted by halogen atoms, alkoxy groups or silyl groups, in which there is no direct SiC bond to an aromatic carbon radical.

3. The process of claim 1, in which the radicals $R^1$ to $R^9$ are selected from hydrogen, a $C_{1-10}$-alkoxy radical, a $C_{6-20}$-aryloxy radical or a monovalent hydrocarbon radical having 1 to 18 carbon atoms that is unsubstituted or substituted by halogen atoms, alkoxy groups or silyl groups.

4. The process of claim 1, in which at least two radicals per molecule of the formula (1) are aliphatic unsaturated organic radicals and no radical is hydrogen.

5. The process of claim 1, in which at least two radicals per molecule of the formula (1) are hydrogen and no radicals are aliphatic unsaturated organic radicals.

6. The process of claim 1, in which at least one radical per molecule of the formula (1) is an aliphatic unsaturated radical and at least one radical is hydrogen.

7. The process or claim 1, in which n in the formula (1) is 5 to 60.

8. The process of claim 1, in which the halosilane of the formula (3) is used in at least an equimolar amount with respect to the siliconate A.

9. The process of claim 1, in which the halosilanes of the formula (3) are chlorosilanes.

10. A crosslinker, a starting material for functional fluids or a unit for siloxane resins, comprising a linear siloxane of the formula (1), $$R^1R^2R^3SiO\text{—}[R\text{—}Si(OSiR^4R^5R^6)O]_n\text{—}SiR^1R^2R^3 \quad (1),$$

a number from 3 to 100
$R^1$, $R^2$, $R^3$, $R^4$, $R^5$, $R^6$, $R^7$, $R^8$ and $R^9$ are independently a hydrogen radical or an organic radical bonded to silicon via carbon or oxygen,
with the proviso that at least two radicals per molecule of the general formula (1) are selected from hydrogen and an aliphatic unsaturated organic radical and
that if none of the radicals $R^1$, $R^2$, $R^3$ are hydrogen or an aliphatic unsaturated organic radical, at least one of the radicals $R^4$, $R^5$, $R^6$ is also neither hydrogen nor an aliphatic unsaturated organic radical.

11. A linear siloxane of the formula (1)

$$R^1R^2R^3SiO\text{—}[R\text{—}Si(OSiR^4R^5R^6)O]_n\text{—}SiR^1R^2R^3 \quad (1)$$

wherein
n is a number from 3 to 100
R is an organic radical bonded to silicon via carbon,
$R^1$, $R^2$, $R^3$, $R^4$, $R^5$ and $R^6$ are each independently a hydrogen radical or an organic radical bonded via carbon or oxygen,
with the proviso that at least two radicals per molecule of the formula (1) are selected from hydrogen and an aliphatic unsaturated organic radical and
that if none of the radicals $R^1$, $R^2$, $R^3$ are hydrogen or an aliphatic unsaturated organic radical, at least one unit $(OSiR^4R^5R^6)$ is also present in which the radicals $R^4$, $R^5$, $R^6$ are neither hydrogen nor an aliphatic unsaturated organic radical.

12. The linear siloxane of claim 11, in which R is a monovalent hydrocarbon radical having 1 to 18 carbon atoms that is unsubstituted or substituted by halogen atoms, alkoxy groups or silyl groups, and in which there is no direct SiC bond to an aromatic carbon radical.

13. The linear siloxane of claim 11, in which the radicals $R^1$ to $R^9$ are selected from hydrogen, a $C_{1-10}$-alkoxy radical, a $C_{6-20}$-aryloxy radical or a monovalent hydrocarbon radical having 1 to 18 carbon atoms that is unsubstituted or substituted by halogen atoms, alkoxy groups or silyl groups.

14. The linear siloxane of claim 11, in which at least two radicals per molecule of the formula (1) are aliphatic unsaturated organic radicals and no radical is hydrogen.

15. The linear siloxane of claim 11, in which at least two radicals per molecule of the formula (1) are hydrogen and no radicals are aliphatic unsaturated organic radicals.

16. The linear siloxane of claim 11, in which at least one radical per molecule of the formula (1) is an aliphatic unsaturated radical and at least one radical is hydrogen.

17. The linear siloxane of claim 11, in which n in the formula (1) is 5 to 60.

* * * * *